(12) United States Patent
Hasegawa et al.

(10) Patent No.: US 10,228,450 B2
(45) Date of Patent: Mar. 12, 2019

(54) RADAR APPARATUS AND INSPECTION SYSTEM

(71) Applicant: DENSO CORPORATION, Kariya, Aichi-pref. (JP)

(72) Inventors: Yutaka Hasegawa, Kariya (JP); Takamasa Ando, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 550 days.

(21) Appl. No.: 14/785,941

(22) PCT Filed: Apr. 21, 2014

(86) PCT No.: PCT/JP2014/061200
§ 371 (c)(1),
(2) Date: Oct. 21, 2015

(87) PCT Pub. No.: WO2014/175230
PCT Pub. Date: Oct. 30, 2014

(65) Prior Publication Data
US 2016/0084939 A1 Mar. 24, 2016

(30) Foreign Application Priority Data
Apr. 23, 2013 (JP) ................. 2013-090565

(51) Int. Cl.
*G01S 13/93* (2006.01)
*G01S 7/40* (2006.01)
(Continued)

(52) U.S. Cl.
CPC .............. *G01S 7/4004* (2013.01); *G01S 7/35* (2013.01); *G01S 7/4026* (2013.01); *G01S 13/42* (2013.01);
(Continued)

(58) Field of Classification Search
CPC ........ G01S 13/42; G01S 13/93; G01S 13/931; G01S 2007/403; G01S 2007/4086;
(Continued)

(56) References Cited

U.S. PATENT DOCUMENTS 5,923,279 A * 7/1999 Bamler ............... G01S 13/9023
342/194
5,999,120 A 12/1999 Yamada
2004/0183713 A1 9/2004 Kumon et al.

FOREIGN PATENT DOCUMENTS

JP 2003-069355 A 3/2003
JP 2004-233277 A 8/2004
(Continued)

OTHER PUBLICATIONS

International Preliminary Report on Patentability; International Application No. PCT/JP2014/061200; Filed: Apr. 21, 2014 (with English translation).
(Continued)

*Primary Examiner* — Timothy A Brainard
(74) *Attorney, Agent, or Firm* — Knobbe, Martens, Olson & Bear, LLP

(57) ABSTRACT

A radar apparatus detects a target that has reflected radar waves on the basis of each of object signals that have been passed, and detects a detection angle that is an angle formed between the target and a specified reference axis. The radar apparatus determines, as an angle correction value, for a target which is disposed at a set distance from the radar apparatus in such a manner that an angle formed between the target and the reference axis becomes a specified angle, a difference between the specified angle and a detection angle that is detected based on a plurality of object signals that pass through the filters by transmitting and receiving radar
(Continued)

waves for the target, and stores the determined angle correction value in a storage unit.

8 Claims, 7 Drawing Sheets

(51) Int. Cl.
  G01S 7/35 (2006.01)
  G01S 13/42 (2006.01)
(52) U.S. Cl.
  CPC ............ G01S 13/93 (2013.01); G01S 13/931 (2013.01); *G01S 2007/403* (2013.01); *G01S 2007/4086* (2013.01); *G01S 2013/9321* (2013.01)
(58) Field of Classification Search
  CPC .. G01S 2013/9321; G01S 7/35; G01S 7/4004; G01S 7/4026

USPC .......................................................... 342/147
See application file for complete search history.

(56) References Cited

FOREIGN PATENT DOCUMENTS

| | | |
|---|---|---|
| JP | 4241451 B2 | 1/2009 |
| JP | 2010-019690 A | 1/2010 |
| JP | 2010-096680 A | 4/2010 |
| JP | 2011-215114 A | 10/2011 |
| JP | 2012-098143 | 5/2012 |
| JP | 2012-211794 A | 11/2012 |
| WO | 2014/175230 A1 | 10/2014 |

OTHER PUBLICATIONS

International Search Report (translated version); International Application No. PCT/JP2014/061200, filed Apr. 21, 2014; 4 pages.

* cited by examiner

RADAR APPARATUS AND INSPECTION SYSTEM

CROSS-REFERENCE TO RELATED APPLICATION

This application is a U.S. National Phase Application under 35 U.S.C. 371 of International Application No. PCT/JP2014/061200 filed on Apr. 21, 2014 and published in Japanese as WO 2014/175230 A1 on Oct. 30, 2014. This application is based on and claims the benefit of priority from Japanese Patent Application No. 2013-090565, filed Apr. 23, 2013. The entire disclosures of all of the above applications are incorporated herein by reference.

TECHNICAL FIELD

The present invention relates to a radar apparatus and an inspection system. In particular, the present invention relates to a radar apparatus that detects an azimuth in which a target is present and an inspection system for inspecting the radar apparatus.

BACKGROUND ART

Radar apparatuses are conventionally used for the purpose of improving driving safety of automobiles (refer to PTL 1). A radar apparatus of this type includes a transmitting unit, a receiving unit, a plurality of mixer units, a plurality of amplifier units, and a signal processing unit. The transmitting unit transmits radar waves. The receiving unit receives incoming waves through each of a plurality of reception antennas. The plurality of mixer units each mix the incoming wave received by each reception antenna with the radar wave transmitted by the transmitting unit and generate a beat signal. The plurality of amplifier units each amplify the beat signal. The signal processing unit detects the distance to a target that has reflected the radar waves and the azimuth in which the target is present (incoming azimuth) based on the results of analysis on the beat signals amplified by the amplifier units.

Usually, each amplifier unit includes a filter and an amplifier. The filter allows passage of a required frequency component of the beat signal generated by the mixer unit. The amplifier amplifies the beat signal that has passed through the filter. The filter is generally composed of a differentiating circuit that has a capacitor and a resistor.

CITATION LIST

Patent Literature

[PTL 1] JP-B-4241451

SUMMARY OF INVENTION

Technical Problem

As shown in FIG. 7, the signal that has passed through the filter mentioned above shows small attenuation (gain) in the signal level in the high-frequency band, but the attenuation becomes greater in the low-frequency band. In addition, the signal that has passed through the filter is delayed in phase thereof in the low-frequency band. The amount of delay in phase resulting from the signals' passing through the filters depends on variations in the quality of the respective capacitors, and thus is different (varies) between filters.

Therefore, the conventional radar apparatuses suffer from a problem that, when a target is present at a short distance, the estimation accuracy is poor in respect of the azimuth in which the target is present (that is, the incoming azimuth). In addition, at the time of shipping the radar apparatuses and assembling the apparatuses into vehicle bodies, inspection and adjustment are required to be performed to ensure accuracy of azimuth detection.

The inspection and adjustment are performed taking account of a situation that a target is present at a long distance and a situation that a target is present at a short distance, so that the outgoing direction of the radar waves and the incoming direction of the incoming waves will coincide with respective desired directions. Specifically, the inspection and adjustment are performed by setting a reflector at each predetermined distance, permitting a radar apparatus to actually transmit and receive radar waves, and estimating the incoming azimuth of the incoming waves.

However, as mentioned above, the estimation accuracy of the azimuth of a target present at a short distance is poor in the conventional radar apparatus, and thus an accurate incoming azimuth cannot be detected, irrespective of the inspection and adjustment of the conventional radar apparatuses in a situation where a target is assumed to be present at a short distance.

In other words, the conventional technique suffers from a problem that highly accurate axis adjustment cannot be performed in the inspection and adjustment performed taking account of a situation that a target is present at a short distance.

Therefore, an object of the present invention is to provide a radar apparatus and an inspection apparatus that enable highly accurate axis adjustment in the inspection and adjustment which are performed taking account of a situation that a target is present at a short distance.

Solution to Problem

A radar apparatus according to an aspect of the present invention includes transmitting and receiving means, filtering means, detecting means, and correction value determining means.

The transmitting and receiving means transmits radar waves and permits each of a plurality of antenna elements to receive incoming waves which are the reflected waves of the radar waves. The filtering means uses a plurality of object signals which correspond to a plurality of signals based on the result of reception by each of the plurality of antenna elements of the transmitting and receiving means, and passes the plurality of object signals through a plurality of respective filters. The plurality of filters each have at least a capacitor and a resistor, and have characteristics that signals having a frequency equal to or lower than a specified frequency specified in advance are passed and, of the signals that are passed, signals in a low-frequency band are delayed in phase relative to signals in a high-frequency band. The detecting means detects a target that has reflected the radar waves, on the basis of each of the plurality of object signals that have passed through the plurality of filters of the filtering means, and detects a detection angle that is an angle formed between the detected target and a specified reference axis.

The correction value determining means determines, as an angle correction value, for a target which is disposed at a set distance from the radar apparatus in such a manner that an angle formed between the target and the reference axis becomes a specified angle, a difference between the specified angle and a detection angle that is detected by the detecting means based on a plurality of object signals that pass through the plurality of filters of the filtering means by transmitting and receiving radar waves to and from the target at transmitting and receiving means, and stores the determined angle correction value in a storage unit.

The angle correction value stored in the storage unit corresponds to an angle that indicates an offset of the detection angle relative to the specified angle, or in other words, an amount of offset of the reference angle. Therefore, for example, when the angle correction value is determined and stored in the storage unit at the time of shipping the radar apparatus, the detection angle can be corrected using the angle correction value.

Thus, according to the above radar apparatus, detection accuracy of the azimuth (that is, the detection angle) in which a target is present can be improved when the target is present at a short distance. As a result, according to the above radar apparatus, a highly accurate axis adjustment can be performed in the inspection and adjustment performed taking account of a situation that the target is present at a short distance.

In addition, in the above radar apparatus, angle correcting means may perform correction of the detection angle detected by the detecting means using the angle correction value stored in the storage unit. According to such a radar apparatus, correction of the detection angle using the angle correction value can be more reliably performed. As a result, according to the above radar apparatus, the azimuth (i.e. the detection angle) in which a target is present at a short distance can be derived with more accuracy.

Furthermore, the above radar apparatus is set in a vehicle such that the reference axis falls in a specified angle range, relative to a setup reference axis specified in the vehicle. In this case, an axis correcting means may specify the reference axis such that a corrected angle resulting from the correction performed by the angle correcting means coincides with a specified angle.

In the radar apparatus as described above, for example, when a corrected angle does not match the specified angle as a result of inspection and adjustment at the time of assembly of the radar apparatus into a vehicle, the reference axis can be reset so that the corrected angle will match the specified angle.

As a result, according to the above radar apparatus, the azimuth (i.e. the detection angle) in which a target is present at a short distance can be more correctly derived after the radar apparatus has been assembled into a vehicle.

Besides the above radar apparatus, the present invention can be implemented in various modes, such as a program for enabling a computer to function as the radar apparatus, and a system for inspecting the radar apparatus.

BRIEF DESCRIPTION OF DRAWINGS

In the accompanying drawings.

DESCRIPTION OF EMBODIMENTS

Figure 1:
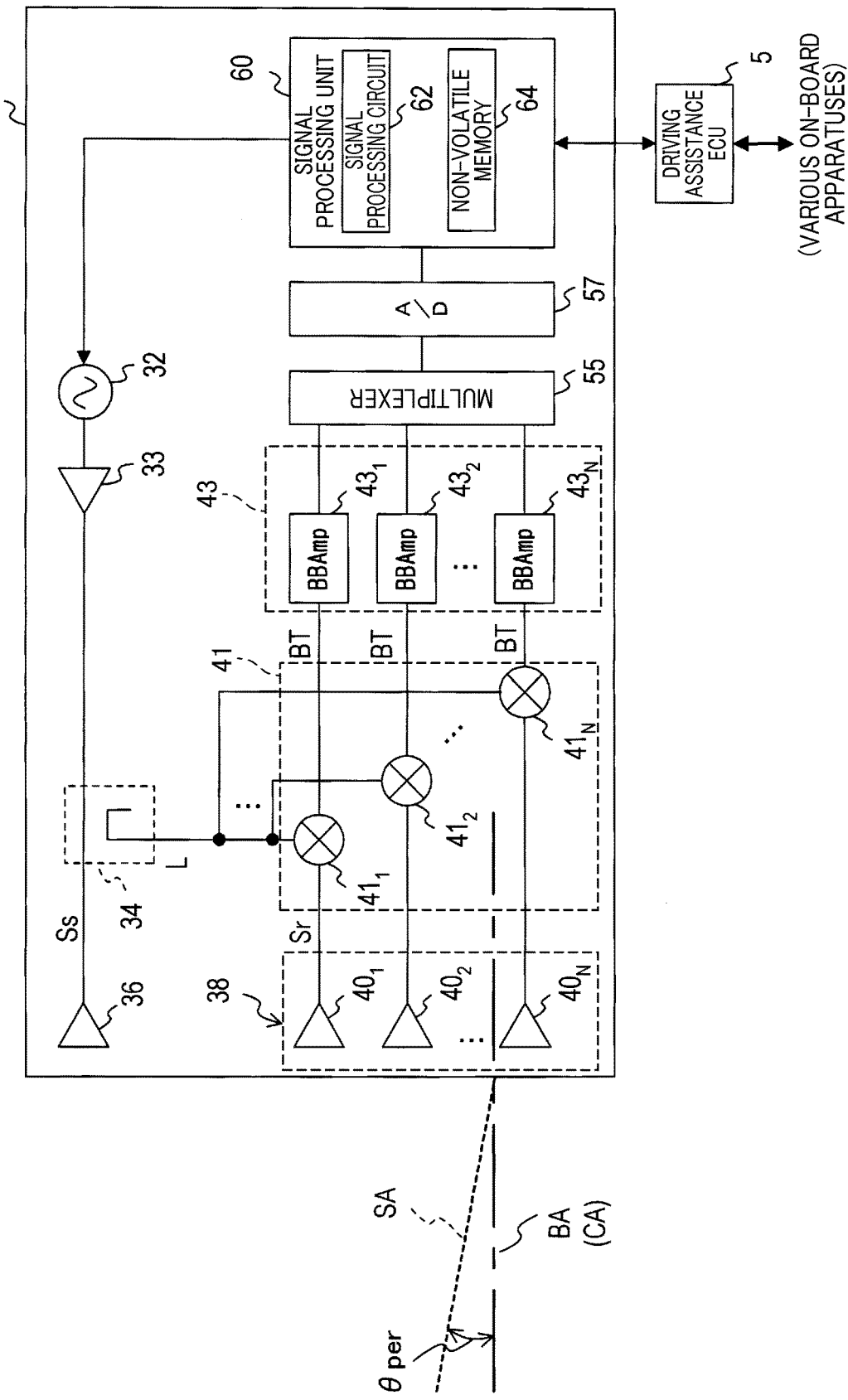
FIG. 1 is a block diagram of a schematic configuration of a radar apparatus according to an embodiment to which the present invention is applied.

An embodiment of the present invention will hereinafter be described with reference to the drawings.
<Radar Apparatus>
A radar apparatus 10 that is shown in FIG. 1 is mounted to an automobile. The radar apparatus 10 is a millimeter wave radar that transmits radar waves ("frequency modulated continuous waves (FMCW)" according to the present embodiment) composed of millimeter-waveband electromagnetic waves, and detects a target based on the results of reception of incoming waves that are the radar waves reflected by the target (reflected waves).

The radar apparatus 10 includes, on a transmission side, an oscillator 32, an amplifier 33, a divider 34, and a transmission antenna 36. The oscillator 32 generates millimeter-waveband high-frequency signals. The high-frequency signals are modulated to have a rising period during which the frequency linearly increases in relation to time and a falling period during which the frequency linearly decreases. The amplifier 33 amplifies the high-frequency signals generated by the oscillator 32. The divider 34 divides power of the output of high-frequency signals amplified by the amplifier 33 into transmission signals Ss and local signals L. Of the signals, the transmission signals Ss are supplied to the transmission antenna 36. The transmission antenna 36 emits radar waves based on the transmission signals Ss from the divider 34.

The radar apparatus 10 also includes, on a reception side, a reception antenna unit 38, a mixer unit 41, a baseband amplifier unit 43, a multiplexer 55, an A/D (analog-to-digital) converter 57, and a signal processing unit 60.

The reception antenna unit 38 includes N antenna elements 40$i$ ($i$=N, N being a natural number). Each antenna element 40$i$ is assigned a single channel CH.

The mixer unit 41 includes N mixers 41$i$ ($i$=N, N being a natural number) in conformity with the antenna elements 40$i$ of the reception antenna unit 38. Each mixer 41$i$ mixes a reception signal Sr from the antenna element 40$i$ with a local signal L from the divider 34 on the transmission side, and generates a beat signal BT. The beat signal BT is a frequency component that is the difference between the reception signal Sr and the local signal L (transmission signal Ss).

Figure 2:
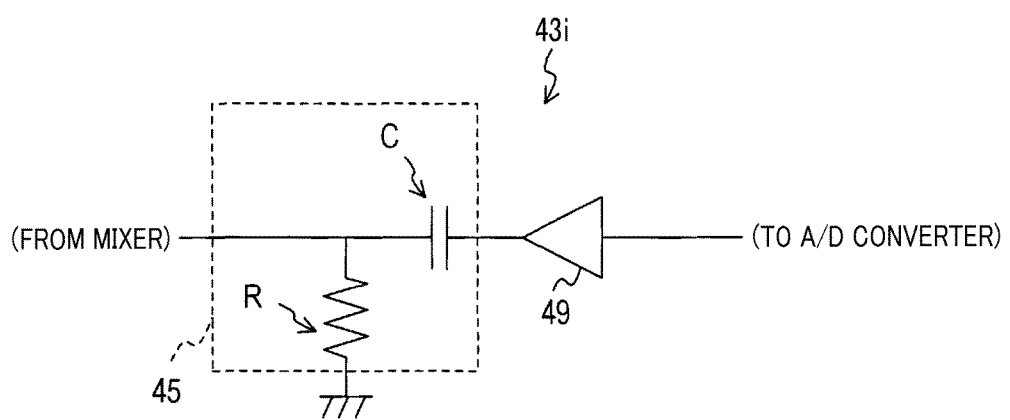
FIG. 2 is a diagram of a configuration of a baseband amplifier.

The baseband amplifier unit 43 includes N baseband amplifiers 43$i$ ($i$=N, N being a natural number) in conformity with the antenna elements 40$i$ of the reception antenna unit 38. Each baseband amplifier 43$i$ removes unnecessary frequency components from the beat signal BT and amplifies the beat signal BT. To achieve this function, each baseband amplifier 43$i$ includes a filter 45 and an amplifier 49, as shown in FIG. 2.

Figure 7:
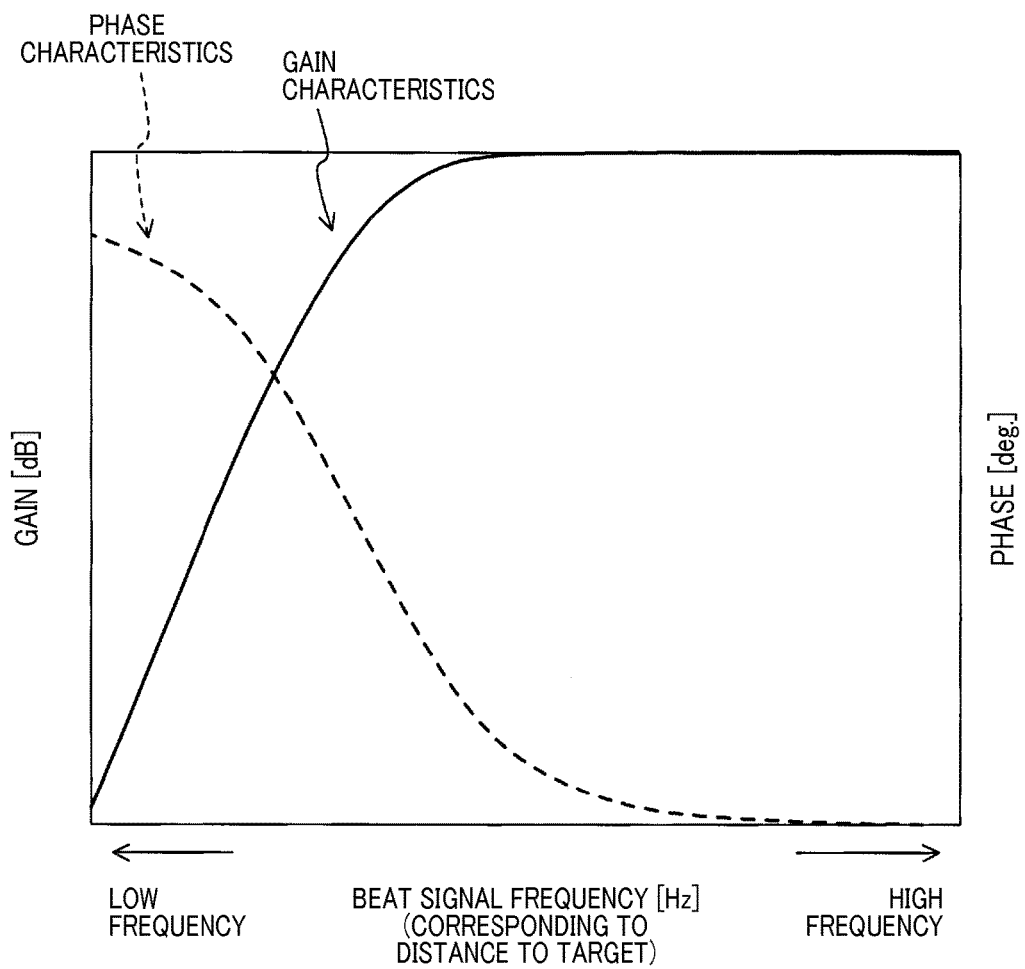
FIG. 7 is a diagram of the characteristics of a filter (differentiating circuit).

Of these, the filter 45 has a differentiating circuit that is mainly configured by a resistor R and a capacitor C. The filter 45 passes a signal having a frequency that is equal to or lower than a specified frequency which is specified in advance. The specified frequency is the frequency of a beat signal BT that corresponds to a maximum detectable distance that can be detected by the radar apparatus 10. In addition, the filter 45 has characteristics that the signal level of a signal that has passed through the filter 45 shows small attenuation in the high-frequency band and the attenuation becomes greater in the low-frequency band, and the phase of the signal is delayed in the low-frequency band (see FIG. 7). In other words, the filter 45 has characteristics that, of the signals passing therethrough, the low-frequency band signals are delayed in phase compared to the high-frequency band signals.

On the other hand, the amplifier 49 is a known amplifier and amplifies the beat signal BT that has passed through the filter 45.

Referring to FIG. 1 again, the multiplexer 55 selects a single channel CH from among a plurality of channels CH and outputs downstream the beat signal BT from each baseband amplifier 43*i*. The A/D converter 57 samples the output from the multiplexer 55 and converts the sampled beat signal BT to digital data.

The signal processing unit 60 includes a signal processing circuit 62 and a non-volatile memory 64. Of these, the signal processing circuit 62 is mainly configured by a known microcomputer that includes at least a ROM (read-only memory), a random access memory (RAM), and a CPU (central processing unit). Furthermore, the signal processing unit 60 includes an arithmetic processing unit (e.g., a DSP (digital signal processor)) for performing a fast Fourier transform (FFT) process and the like on the data retrieved via the A/D converter 57. The non-volatile memory 64 is a non-volatile storage unit (such as a flash memory).

The signal processing unit 60 controls the start and stop of the oscillator 32, and the sampling of the beat signals BT via the A/D converter 57. In addition, the signal processing unit 60 performs signal processing using the sampling data, communicates with a drive assist ECU 5, and performs a target detection process in which information (e.g., vehicle speed) necessary for signal processing and target information obtained as a result of the signal processing are transmitted and received.

In the above-described configurations, the oscillator 32, the amplifier 33, the divider 34, the transmission antenna 36, the reception antenna unit 38 (reception antennas 40*i*), and the mixer unit 41 (mixers 41*i*) correspond to the transmitting and receiving means. The plurality of baseband amplifiers 43*i* (filters 45 and amplifiers 49) of the baseband amplifier unit 43 correspond to the filtering means. The non-volatile memory 64 corresponds to the storage unit. The signal processing unit 60 (signal processing circuit 62) corresponds to the detecting means, the correction value determining means, the angle correcting means, and the axis correcting means.

<Overview of Operations of the Radar Apparatus>

In the radar apparatus 10 configured as described above, when the oscillator 32 oscillates according to a command from the signal processing unit 60, the oscillator 32 generates high-frequency signals. The amplifier 33 then amplifies the generated high-frequency signals. The divider 34 divides power of the amplified high-frequency signals into the transmission signals Ss and the local signals L. Of these, the transmission signals Ss are transmitted as the radar waves via the transmission antenna 36.

Then, of the radar waves that have been sent out from the transmission antenna 36, the radar waves that are reflected by a target are received, as incoming waves, by all of the antenna elements 40*i* configuring the reception antenna unit 38. The reception signal Sr from each antenna element 40*i* is supplied to the mixer 41*i* in the mixer unit 41. Thus, each mixer 41*i* generates the beat signal BT. Then, in each baseband amplifier 43*i* of the baseband amplifier unit 43, the filter 45 removes unnecessary frequency components from the beat signal BT and the amplifier 49 amplifies the beat signal BT. Subsequently, the amplified beat signals BT are supplied to the A/D converter 57 via the multiplexer 55, and the A/D converter 57 samples the beat signals BT. The sampling values of the beat signals BT are retrieved by the signal processing unit 60.

The signal processing unit 60 then derives the distance to a target and a relative speed using a method known for FMCW radars, on the basis of the sampling value of the beat signal BT as an object signal. Furthermore, the signal processing unit 60 detects the incoming azimuth (also referred to, hereafter, as a "detection angle") by a known incoming azimuth estimation method (e.g., MUSIC (multiple signal classification) or digital beam forming) which is in accord with the phase difference of incoming waves, on the basis of the sampling value of the beat signal BT. The detection angle is an azimuth (angle) in which a target is present, relative to a reference axis BA set in the radar apparatus 10.

In other words, the radar apparatus 10 derives at least a distance between the radar apparatus 10 and the target, a relative speed between the radar apparatus 10 and the target, and a detection angle, as information related to the target.

The drive assist ECU 5 controls other in-vehicle control units and other in-vehicle devices, and realizes known adaptive cruise control (ACC) and pre-crash safety systems. The adaptive cruise control (ACC) is performed for maintaining an appropriate inter-vehicle distance between a leading vehicle and the own vehicle. The pre-crash safety system reinforces the braking force of the vehicle and the restraining force of the seatbelts when a collision with an obstacle present on an advancing path of the own vehicle is unavoidable.

<Inspection System>

In the radar apparatus 10 such as this, inspection and adjustment, as to whether the reference axis BA is set in the radar apparatus 10 coinciding with a desired direction, are required to be performed at the time of shipping the radar apparatus 10 to ensure accuracy of azimuth detection.

Figure 3:
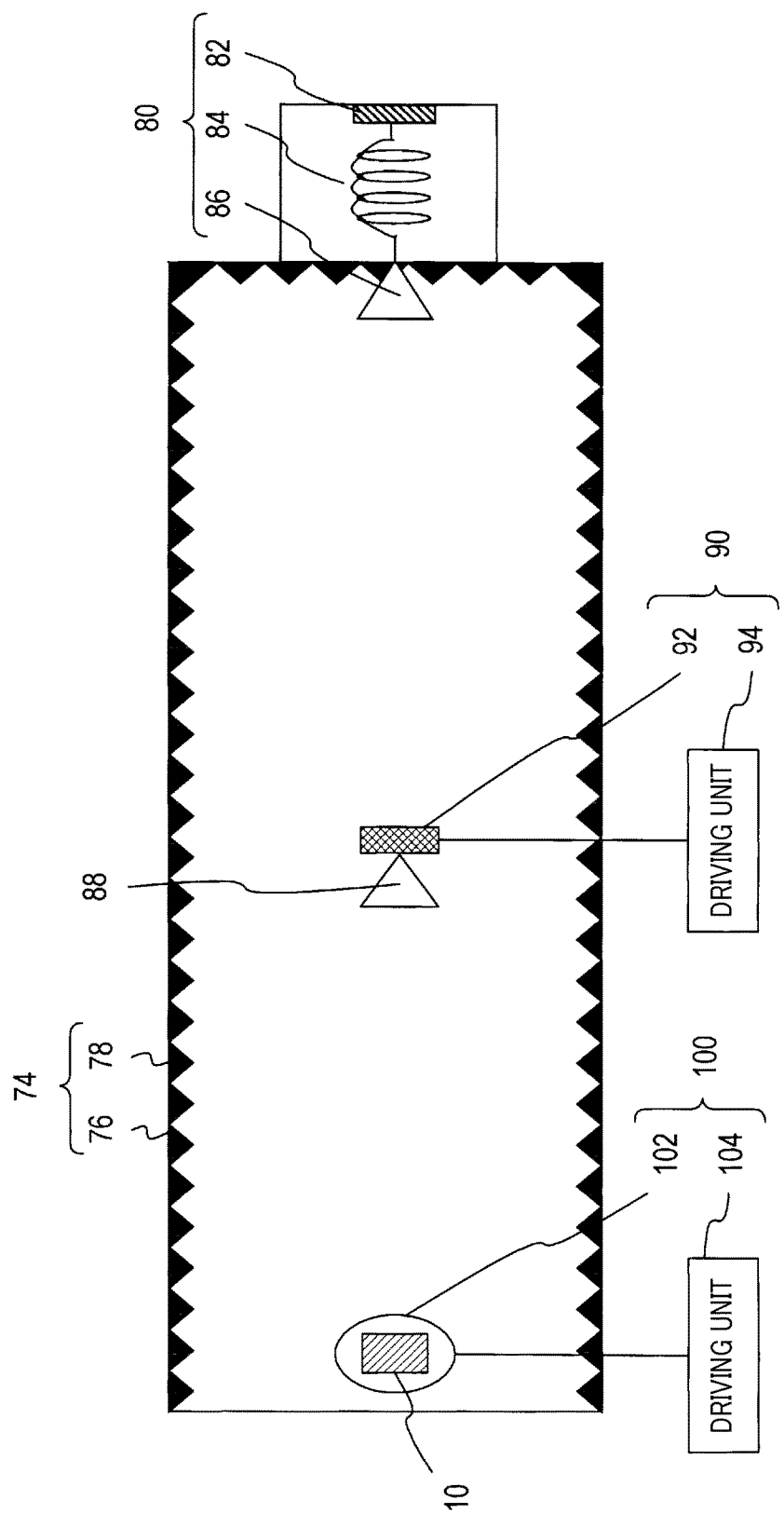
FIG. 3 is a diagram of the schematic configuration of an inspection system according to an embodiment to which the present invention is applied.

The inspection and adjustment are performed in two inspection modes, which are short distance inspection and long distance inspection, using an inspection system 70 shown in FIG. 3, so that the incoming direction of the incoming waves coincides with a desired direction.

Long distance inspection refers to inspection and adjustment performed in a state where a target is disposed at a first setup position in a positional relationship with the radar apparatus 10. The first setup position establishes a distance from the radar apparatus 10 to the target as a first set distance (e.g., 100 m) specified in advance.

In addition, short distance inspection refers to inspection and adjustment performed in a state where a target is disposed at a second setup position in a positional relationship with the radar apparatus 10. The second setup position establishes a distance from the radar apparatus 10 to the target as a second set distance (e.g., 2 m), shorter than the first set distance. The second set distance permits the beat signal BT to fall within the low-frequency band in the filter 45 of each baseband amplifier 43*i*.

The inspection system 70 shown in FIG. 3 includes an inspection mechanism 72 and an object setting mechanism 100. Of these, the inspection mechanism 72 includes an anechoic chamber 74, a delay unit 80, a reflector 88, and a target driving unit 90.

The anechoic chamber 74 is a known one that has a cavity therein for housing the radar apparatus 10 and absorbs radio waves (e.g., noise) unnecessary for inspection and adjustment. The anechoic chamber 74 that realizes this includes a case 76 and a radio-wave absorber 78.

The case 76 has a cavity therein and is formed into a rectangular parallelepiped shape as a whole. The case 76 has one end in the longitudinal direction which is formed with an opening, and the other end which is sealed (the end which is sealed without being formed with an opening is hereafter referred to as a sealed end). The radio-wave absorber 78 is a known one that absorbs radio waves (e.g., noise) unnecessary for inspection and adjustment, and is fixed to an inner wall of the case 76.

The delay unit 80 includes a reflecting part 82, a signal delay part 84, and an antenna 86. The reflecting part 82 totally reflects the received radar waves. The signal delay part 84 adds time delay to the received radar waves (or the radar waves reflected by the reflecting part 82). The antenna 86 receives the radar waves from the radar apparatus 10 and outputs the radar waves to which the time delay has been added by the signal delay part 84. The antenna 86 is fixed to the sealed end of the case 76.

The time to be added as delay time by the signal delay part 84 is obtained by subtracting the time taken for the radar wave to advance over the distance from the set position of the radar apparatus 10 to the antenna 86, from the time taken for the radar wave to advance over the first set distance. In other words, the delay unit 80 virtually creates a target position corresponding to the first setup position in the positional relationship with the radar apparatus 10.

The reflector 88 is a known corner cube reflector that reflects the radar waves in the incoming direction. The reflector 88 is, for example, a triangular pyramid member formed by three metal plates that reflect electromagnetic waves, with an apex angle being 90 degrees.

The target driving unit 90 includes a holding mechanism 92 that holds the reflector 88, and a driving unit 94 that drives the reflector 88 held by the holding mechanism 92. The driving unit 94 moves the reflector 88 held by the holding mechanism 92 to an inspection standby position or a short distance inspection position. The inspection standby position herein refers to a position that is specified outside the anechoic chamber 74 such that the reflector 88 is present outside the anechoic chamber 74. In addition, the short distance inspection position is specified inside the anechoic chamber 74 such that the reflector 88 is present inside the anechoic chamber 74, and is on a straight line connecting the set position of the radar apparatus 10 and the antenna 86 of the delay unit 80, and is at the second set distance from the set position of the radar apparatus 10.

The object setting mechanism 100 includes a placement base 102 on which the radar apparatus 10 is placed, and a drive 104 that rotates the placement base 102. The set position where the radar apparatus 10 is set is specified in the placement base 102.

The drive 104 rotates the placement base 102 such that the reference axis BA specified in the radar apparatus 10 makes a plurality of specified angles relative to an axis that connects the radar apparatus 10 placed at the set position on the placement base 102 and the antenna 86. The specified angles are specified in advance as inspection items in the inspection and adjustment, and are --10°, -8°, -6°, -4°, -2°, 0°, 2°, 4°, 6°, 8°, 10° and the like.

<Pre-Shipping Axis Adjustment Process>

Next, the following description deals with a pre-shipping axis adjustment process performed by the signal processing unit 60 of the radar apparatus 10. The pre-shipping axis adjustment process, which corresponds to the inspection and adjustment of the radar apparatus 10 using the inspection system 70, is performed at an inspection stage before shipping the radar apparatus 10.

The pre-shipping axis adjustment process is started when the radar apparatus 10 is placed at the set position on the placement base 102 in the object setting mechanism 100, and operating mode of the radar apparatus 10 is switched to an inspection mode. At startup of the pre-shipping axis adjustment process, the reflector 88 in the inspection system 70 is present at the inspection standby position.

Figure 4:
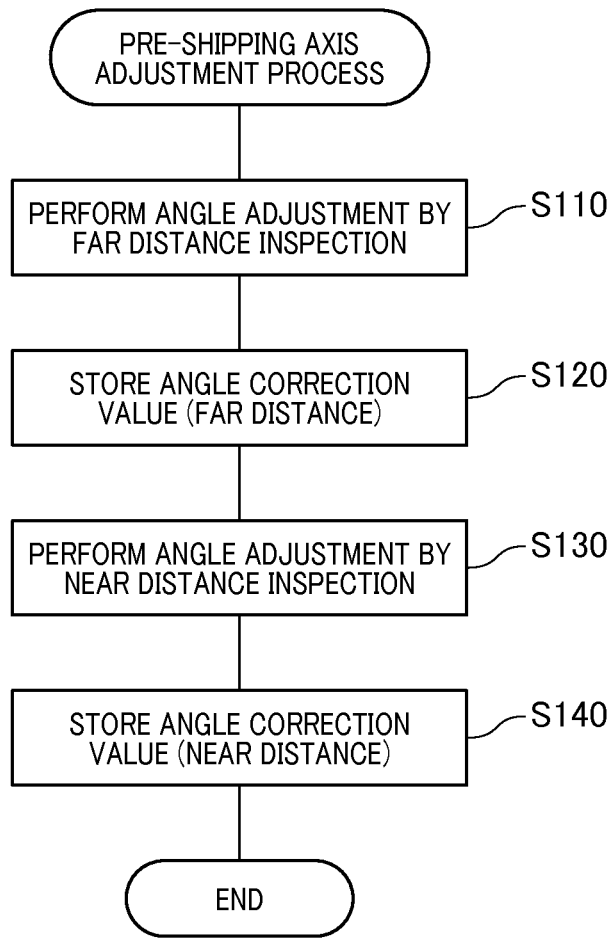
FIG. 4 is a flowchart for a procedure of a pre-shipping axis adjustment process.

When the pre-shipping axis adjustment process is started, the signal processing unit 60 performs, as shown in FIG. 4, angle adjustment for long distance inspection for each specified angle (step S110). At step S110, the signal processing unit 60 performs angle adjustment using a known method. For example, when the specified angle is 0°, the angle adjustment is performed by a known calibration method, and when the specified angle is other than 0°, the angle adjustment is performed by a known CF method.

As an example, in the angle adjustment at step S110, the radar apparatus 10 outputs radar waves, and based on the results of reception of the incoming waves from the antenna 86 in the delay unit 80 by each antenna element 40i, the signal processing unit 60 estimates the azimuth (that is, the detection angle) in which the antenna 86, which serves as a target, is present. Then, the signal processing unit 60 adjusts parameters required for azimuth detection so that the detection angles match the respective specified angles set at the time of inspection. In other words, at step S110, the signal processing unit 60 stores, in the radar apparatus 10, that the phase difference of each incoming wave received by each antenna element 40i in the radar apparatus 10 indicates the specified angle, and corrects the angle setting of the reference axis BA at the long distance.

Subsequently, the signal processing unit 60 derives, for each specified angle, a difference (referred to, hereafter, as a "long-distance angle correction value") between the detection angle estimated at the earlier step S110 and the specified angle set at the time of inspection in estimating the detection angle, and stores the difference in the non-volatile memory 64 (step S120).

After that, an operator of the pre-shipping axis adjustment process turns on an external switch to start the driving unit 94 of the target driving unit 90, and arranges the reflector 88 in the short distance inspection position. In the pre-shipping axis adjustment process, the signal processing unit 60 performs angle adjustment of short distance inspection for each specified angle (step S130). At step S130, the angle adjustment is performed using a known method. For example, when the specified angle is 0°, the angle adjustment is performed by a known calibration method, and when the specified angle is other than 0°, the angle adjustment is performed by a known CF method.

As an example, in the angle adjustment at step S130, radar waves are outputted from the radar apparatus 10, the incoming waves from the reflector 88 are received by each antenna element 40i, and the azimuth (that is, the detection angle) in which the reflector 88 serving as a target is present is estimated. Then, parameters required for azimuth detection are adjusted such that the detection angles match the respective specified angles set at the time of inspection. In other words, at step S130, the signal processing unit 60 stores, in the radar apparatus 10, that the phase difference of each incoming wave received by each antenna element 40i in the radar apparatus 10 indicates the specified angle, and corrects the angle setting of the reference axis BA at the short distance.

Subsequently, the signal processing unit 60 derives, for each specified angle, a difference (referred to, hereafter, as a "short-distance angle correction value") between the detection angle estimated at step S130 and the specified angle set at the time of inspection in estimating the detection angle, and stores the difference in the non-volatile memory 64 (step S140).

Figure 5:
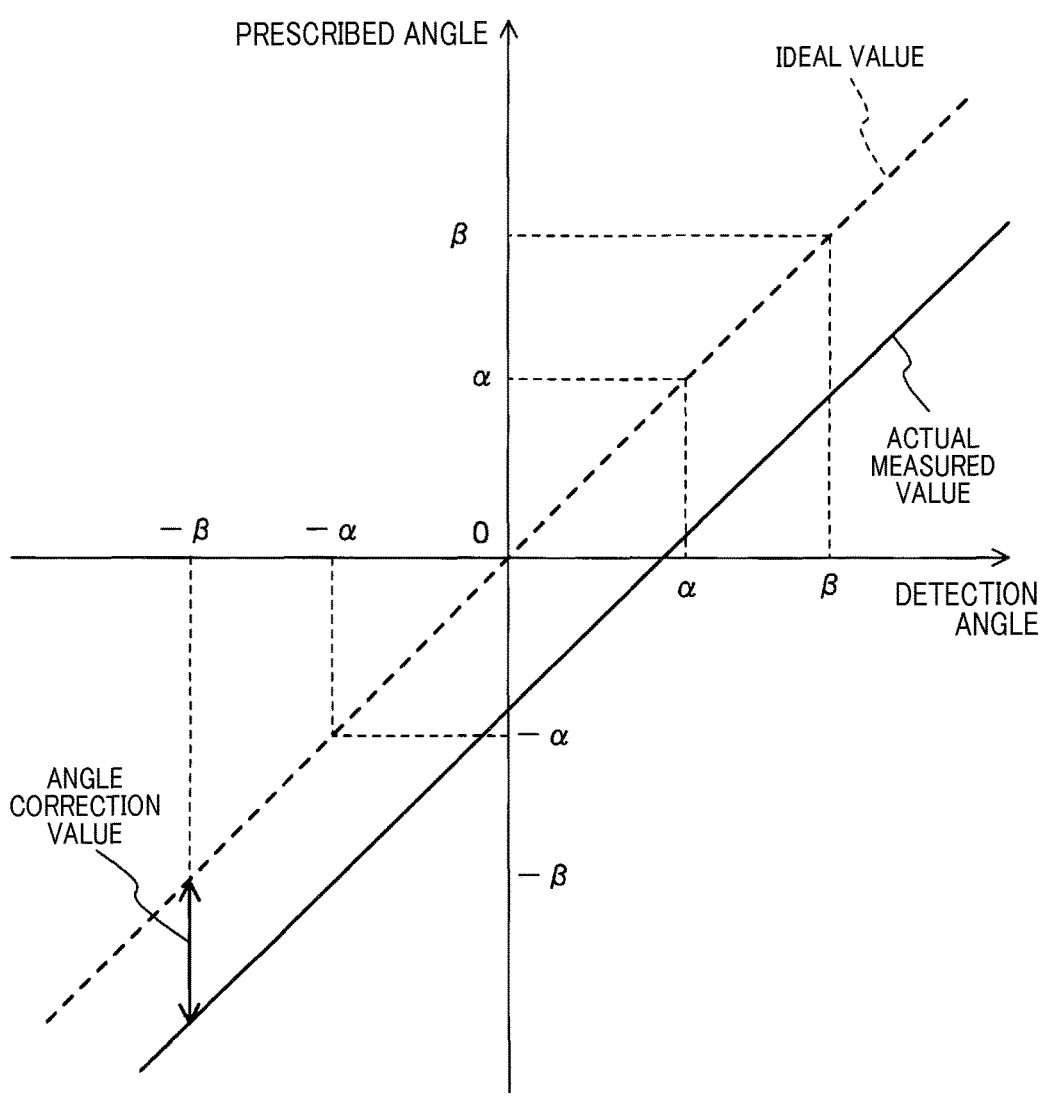
FIG. 5 is a diagram of an overview of an angle correction value.

In other words, as shown in FIG. 5, the long- and short-distance angle correction values determined in the pre-shipping axis adjustment process each correspond to a difference between an ideal value of the detection angle for each specified angle and an actual measured value, in the case where azimuth detection is performed at each specified angle. The long- and short-distance angle correction values may each be a difference in angle, or may be a parameter required for azimuth detection (e.g., information related to phase).

After that, the pre-shipping axis adjustment process is terminated. In other words, in the pre-shipping axis adjustment process, a detection angle is estimated based on the results of transmission and reception of radar waves, for a target which is disposed at the first set distance and the second set distance from the set position of the radar apparatus 10, with the angle formed relative to the reference axis BA being set to coincide with each of the specified angles. Then, the signal processing unit 60 derives a difference between each detection angle and the specified angle, which has been set at the time of inspection in estimating the detection angle, and stores the difference in the non-volatile memory 64 as an angle correction value.

<At-Assembly Axis Adjustment Process>

The following description deals with an at-assembly axis adjustment process performed by the signal processing unit 60 of the radar apparatus 10. The at-assembly axis adjustment process, that is an inspection item, is performed in the course of assembling the radar apparatus 10 into a vehicle. By performing the at-assembly axis adjustment process, the reference axis is adjusted such that the actual measured value of the detection angle matches an ideal value in the radar apparatus 10 that has been assembled into the vehicle.

Usually, the radar apparatus 10 is assembled into a vehicle such that a center axis CA of the radar apparatus 10 falls in an allowable specified angle range θper (see FIG. 1) relative to a setup reference axis SA (see FIG. 1) set in the vehicle. The allowable specified angle range θper is specified in advance as an angle range tolerating an offset of the center axis CA relative to the setup reference axis SA. The center axis CA and the reference axis BA may be served by a single axis, or may be separately provided.

Figure 6:
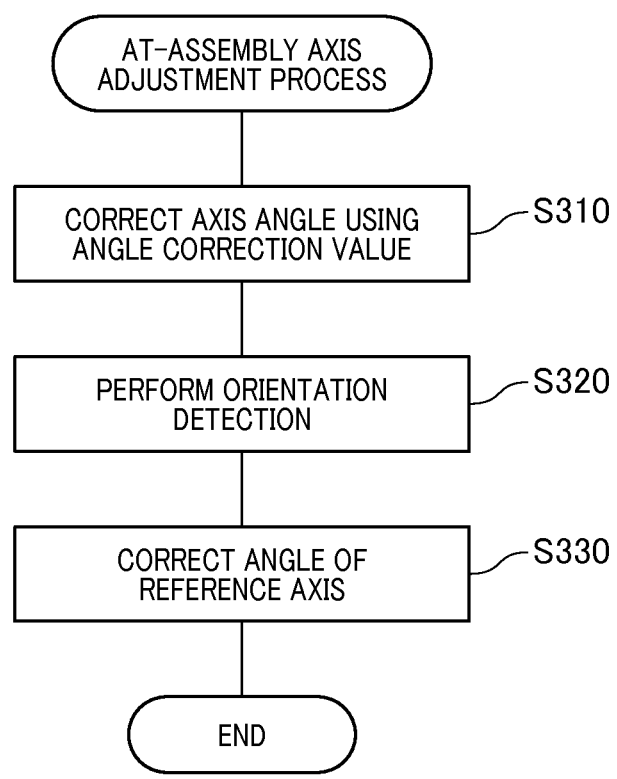
FIG. 6 is a flowchart for a procedure of an at-assembly axis adjustment process.

When the at-assembly axis adjustment process is started, as shown in FIG. 6, the signal processing unit 60 acquires the long- and short-distance angle correction values stored in the non-volatile memory 64, and corrects the reference axis BA based on the acquired long- and short-distance angle correction values (step S310).

In the correction at step S310, specifically, the signal processing unit 60 resets an angle obtained by adding the long-distance angle correction value to the angle of the reference axis BA set in the radar apparatus 10, as the angle of the reference axis BA at the long distance. Further, in the correction at step S310, the signal processing unit 60 resets an angle obtained by adding the short-distance angle correction value to the angle of the reference axis BA set in the radar apparatus 10, as the angle of the reference axis BA at the short distance.

In other words, at Step S310, as shown in FIG. 5, the reference axis BA is set such that the actual measured value matches an ideal value of the detection angle for each specified angle, based on the long- and short-distance angle correction values determined in the pre-shipping axis adjustment process.

Then, azimuth detection is performed (step S320). Specifically, radar waves are outputted, the incoming waves from the reflector 88 disposed at the short distance (e.g., 2 m) specified in advance are receives by the antenna elements 40i, and the azimuth (that is, the detection angle) in which the reflector 88 as a target is present is estimated. The reflector 88 herein is disposed at a set angle (e.g., 0 degree) that is set in advance relative to the setup reference axis SA.

Furthermore, the signal processing unit 60 readjusts (corrects) the angle of the reference axis BA such that the detection angle estimated at S320 is recognized as the set angle (step S330). Then, the at-assembly axis adjustment process is terminated.

The angle of the reference axis BA in a range from the first set distance (long distance) to the second set distance (short distance) may be set by linear interpolation using the angle of the reference axis BA at the long distance and the angle of the reference axis BA at the short distance.

Specifically, in the at-assembly axis adjustment process, the angle difference of the reference axis BA is offset by the long- and short-distance angle correction values. Then, azimuth detection is performed using the reflector 88 arranged at the set angle in accord with the angle of the reference axis BA that has been reset by the offsetting. As a result of this, a recognized value of the angle of the reference axis BA is readjusted such that the detection angle is detected as the set angle.

In the radar apparatus 10 in which the angle of the reference axis BA is set in this way, when operation is performed in a normal operating mode, an angle is estimated as a detection angle, the angle being formed between the reference axis BA set (corrected) in the at-assembly axis adjustment process and the axis connecting the radar apparatus 10 and the target.

[Effects According to the Embodiment]

As described above, in the radar apparatus 10, an angle difference of the reference axis BA at the short distance is offset by the short-distance angle correction value.

Therefore, in the radar apparatus 10, when a target is present at a short distance in a normal operating mode, detection accuracy of the azimuth (i.e. the detection angle) in which a target is present can be improved.

As a result, according to the radar apparatus 10, a highly accurate axis adjustment can be performed in the inspection and adjustment performed taking account of a situation that a target is present at a short distance. Furthermore, axis adjustment after assembling the radar apparatus 10 into the vehicle can be performed in a small space, and a large space is no longer required to be secured for axis adjustment.

Furthermore, in the radar apparatus 10, the angle difference of the reference axis BA at the long distance is offset by the long-distance angle correction value. Therefore, according to the radar apparatus 10, accuracy of the detection angle detected in a normal operating mode can also be improved in respect of a target present at a long distance from the radar apparatus 10.

As a result, according to the radar apparatus 10, accuracy is improved in a detection angle estimated in mounting the radar apparatus 10 to a vehicle. The drive assist ECU 5 that has received information related to a target from the radar apparatus 10 can realize drive assist control, such as adaptive cruise control (ACC) and the pre-crash safety system, with higher accuracy.

Steps S110 to S140 shown in FIG. 4 correspond to the correction value determining means. Of the steps shown in FIG. 6, steps S310 and S320 correspond to the angle correcting means, and step S330 corresponds to the axis correcting means.

[Other Embodiments]

An embodiment of the present invention has so far been described. However, the present invention should not be construed as being limited to the foregoing embodiment but can be implemented in various modes in a scope not departing from the spirit of the present invention.

For example, according to the foregoing embodiment, the radar apparatus 10 to which the present invention is applied is described as a FMCW radar. However, the radar apparatus to which the present invention can be applied is not limited to the FMCW radar. In other words, the radar apparatus to which the present invention can be applied may be a CW (continuous wave) radar or a pulse radar so long as the radar apparatus is capable of performing azimuth detection based on the phase difference in incoming waves which are received by the antenna elements 40i and removed with unnecessary frequency components by a filter having a capacitor and a resistor.

In addition, according to the foregoing embodiment, the object to which the radar apparatus 10 is mounted is an automobile. However, the objects to which the radar apparatus 10 is mounted should not be construed as being limited to automobiles, but may be moving bodies such as motorcycles, marine vessels, or aircraft.

Part of the configuration of the foregoing embodiment may be omitted to an extent that the problem can be solved. Such a mode should also be an embodiment of the preset invention. Further, the foregoing embodiment may be appropriately combined with a modification. Such a mode should also be an embodiment of the present invention. In addition, any mode conceivable without departing from the essence of the invention defined by the wordings of the claims should also be an embodiment of the present invention.

Reference numbers used in the description of the foregoing embodiment are used as appropriate in the claims. However, the reference numbers are used for the purpose of facilitating understanding of the subject matter of each claim and are not intended to limit the technical scope of the subject matter of each claim.

REFERENCE SIGNS LIST

5: drive assist ECU
10: radar apparatus
32: oscillator
33: amplifier
34: divider
36: transmission antenna
38: reception antenna unit
40i: antenna element
41: mixer unit
41i: mixer
43: baseband amplifier unit
43i: baseband amplifier
45: filter
49: amplifier
55: multiplexer
57: A/D converter
60: signal processing unit
62: signal processing circuit
64: non-volatile memory
70: inspection system
72: inspection mechanism
74: anechoic chamber
76: case
78: radio-wave absorber
80: delay unit
82: reflecting part
84: signal delay part
86: antenna
88: reflector
90: target driving unit
92: holding mechanism
94: driving unit
100: object setting mechanism
102: placement base
104: driving unit

The invention claimed is:

1. A radar apparatus comprising:
a transmitting and receiving means for transmitting radar waves and permitting each of a plurality of antenna elements to receive incoming waves that are reflected waves of the radar waves;
a filtering means that includes a plurality of filters used for a plurality of object signals that are a plurality of signals based on the result of reception by each of the plurality of antenna elements of the transmitting and receiving means, each of the filters including at least a capacitor and a resistor, the filters being configured to pass signals having a frequency equal to or lower than a specified frequency specified in advance, and, of the signals that are passed, the filters being configured to delay in phase signals in a first-frequency band from signals in a second-frequency band, the second-frequency band comprising higher frequencies than the first-frequency band, the plurality of filters being permitted to pass therethrough the respective plurality of object signals;
a detecting means, using a processor, for detecting a target that has reflected the radar waves on the basis of each of the plurality of object signals that have passed through the filtering means, and detecting a detection angle that is an angle formed between the detected target and a specified reference axis; and
a correction value determining means, using the processor, determines, as an angle correction value, for a target which is disposed at a set distance from the radar apparatus in such a manner that an angle formed between the target and the reference axis becomes a specified angle, a difference between the specified angle and a detection angle that is detected by the detecting means based on a plurality of object signals that pass through the filtering means by transmitting and receiving radar waves for the target at transmitting and receiving means, and stores the determined angle correction value in a storage unit.

2. The radar apparatus according to claim 1, wherein the apparatus comprises an angle correcting means, using the processor, for performing correction of a detection angle detected by the detecting means using an angle correction value stored in the storage unit.

3. The radar apparatus according to claim 2, wherein:
the radar apparatus is set in a vehicle such that the reference axis falls in a specified angle range relative to a setup reference axis specified in the vehicle; and
the radar apparatus comprises an axis correcting means, using the processor, for readjusting recognition of the reference axis such that a corrected angle that is a result of correction made by the angle correcting means coincides with the specified angle.

4. The radar apparatus according to claim 3, wherein the set distance corresponds to a frequency range that causes the delay in phase as a phase characteristic of the filters.

5. The radar apparatus according to claim 2, wherein the set distance corresponds to a frequency range that causes the delay in phase as a phase characteristic of the filters.

6. The radar apparatus according to claim 1, wherein the set distance corresponds to a frequency range that causes the delay in phase as a phase characteristic of the filters.

7. An inspection system for inspecting a radar apparatus, the inspection system comprising:
a transmitting and receiving means for transmitting radar waves and permitting each of a plurality of antenna elements to receive incoming waves that are reflected waves of the radar waves;
a filtering means that includes a plurality of filters used for a plurality of object signals that are a plurality of signals based on the result of reception by each of the plurality of antenna elements of the transmitting and receiving means, each of the filters including at least a capacitor and a resistor, the filters being configured to pass signals having a frequency equal to or lower than a specified frequency specified in advance, and, of the signals that are passed, the filters being configured to delay in phase signals in a first-frequency band from signals in a second-frequency band, the second-frequency band comprising higher frequencies than the first-frequency band, the plurality of filters being permitted to pass therethrough the respective plurality of object signals; and
a detecting means, using a processor, for detecting a target that has reflected the radar waves on the basis of each of the plurality of object signals that have passed through the filtering means, and detecting a detection angle that is an angle formed between the detected target and a specified reference axis, characterized in that the inspection system comprises:
a correction value determining means, using the processor, determines, as an angle correction value, for a target which is disposed at a set distance from the radar apparatus in such a manner that an angle formed between the target and the reference axis becomes a specified angle, a difference between the specified angle and a detection angle that is detected by the detecting means based on a plurality of object signals that pass through the filtering means by transmitting and receiving radar waves to and from the target at transmitting and receiving means, and stores the determined angle correction value in a storage unit.

8. An inspection method for a radar apparatus, comprising:
transmitting, by a transmitting and receiving means of the radar apparatus, radar waves and allowing a plurality of antenna elements to receive incoming waves that are reflected waves of the radar waves;
allowing, by a filtering means of the radar apparatus, a plurality of filters to use a plurality of object signals that are a plurality of signals based on the result of reception by each of the plurality of antenna elements, the filters being configured to pass signals having a frequency equal to or lower than a specified frequency specified in advance are passed, and, of the signals that are passed, the filters being configured to delay in phase signals in a first-frequency band from signals in a second-frequency band, the second-frequency band comprising higher frequencies than the first-frequency band, the plurality of filters being permitted to pass therethrough the respective plurality of object signals;
detecting, as performed by a detecting means, using a processor, of the radar apparatus, a target that has reflected the radar waves on the basis of each of the plurality of object signals that have passed through the filtering means, and detecting a detection angle that is an angle formed between the detected target and a specified reference axis; and
determining, by a correction value determining means, using the processor, of the radar apparatus, as an angle correction value, for a target which is disposed at a set distance from the radar apparatus in such a manner that an angle formed between the target and the reference axis becomes a specified angle, a difference between the specified angle and a detection angle that is detected by the detecting means based on a plurality of object signals that pass through the filtering means by transmitting and receiving radar waves for the target at transmitting and receiving means, and storing the determined angle correction value in a storage unit.

* * * * *